US009971659B1

(12) United States Patent
McCabe et al.

(10) Patent No.: US 9,971,659 B1
(45) Date of Patent: May 15, 2018

(54) MEMORY PROGRAMMING PROVIDING CORRUPTION PROTECTION

(71) Applicant: Western Digital Technologies, Inc., Irvine, CA (US)

(72) Inventors: Timothy J. McCabe, Mission Viejo, CA (US); Edwin D. Barnes, Lake Forest, CA (US); Michael W. Webster, San Jose, CA (US); Paul Bricketto, Laguna Niguel, CA (US); Hee Kwong, Rancho Santa Margarita, CA (US); Karman Tam, Eastvale, CA (US); Michael F. Klett, Lake Forest, CA (US); Tino Lin, Tustin, CA (US); Mark Nguyen, Fountain Valley, CA (US); John Minh Hon Quan, Cerritos, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 141 days.

(21) Appl. No.: 14/748,616

(22) Filed: Jun. 24, 2015

(51) Int. Cl.
*G06F 11/00* (2006.01)
*G06F 11/14* (2006.01)
*G06F 9/44* (2018.01)

(52) U.S. Cl.
CPC ........ *G06F 11/1469* (2013.01); *G06F 9/4401* (2013.01); *G06F 11/1451* (2013.01); *G06F 2201/84* (2013.01); *G06F 2201/85* (2013.01)

(58) Field of Classification Search
CPC .................................................. G06F 11/1469
See application file for complete search history.

(56) References Cited

U.S. PATENT DOCUMENTS

| | | | |
|---|---|---|---|
| 6,499,054 B1 | 12/2002 | Hesselink et al. | |
| 6,732,158 B1 | 5/2004 | Hesselink et al. | |
| 6,772,364 B1 | 8/2004 | Pinter et al. | |
| 7,082,549 B2 * | 7/2006 | Rao ..................... | G06F 11/1004 707/999.202 |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |

(Continued)

*Primary Examiner* — Christopher McCarthy
(74) *Attorney, Agent, or Firm* — Chang & Hale LLP

(57) ABSTRACT

Systems and methods are disclosed for programming non-volatile storage. Methods involve identifying boot loader code stored in a first partition of a non-volatile storage, the boot loader code being marked as active, executing the boot loader code using one or more processors of the computing system, loading a firmware image to a second partition of the non-volatile storage, the second partition being separate from the first partition, and marking the firmware image as active. Methods further involve detecting a power loss event and, following a power cycle, determining that the firmware image is stored in the second partition and has been marked as active, and, in response to said determination, making a copy of the firmware image and storing the copy in the first partition.

16 Claims, 2 Drawing Sheets

(56) References Cited

U.S. PATENT DOCUMENTS

| | | |
|---|---|---|
| 8,004,791 B2 | 8/2011 | Szeremeta et al. |
| 8,046,631 B2 * | 10/2011 | Jibbe .................. G06F 11/1417 |
| | | 714/42 |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,392,762 B2 | 3/2013 | Aralakuppe Ramegowda et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 8,914,627 B2 * | 12/2014 | Park ...................... H04L 9/3242 |
| | | 713/2 |
| 9,710,652 B1 * | 7/2017 | Condra ............... G06F 11/1417 |
| 2004/0153846 A1 * | 8/2004 | Lee ..................... G06F 11/1417 |
| | | 714/42 |
| 2005/0144195 A1 | 6/2005 | Hesselink et al. |
| 2005/0144200 A1 | 6/2005 | Hesselink et al. |
| 2007/0033387 A1 * | 2/2007 | Arnez ................. G06F 11/1417 |
| | | 713/1 |
| 2007/0074015 A1 * | 3/2007 | Shiiba ................. G06F 11/1417 |
| | | 713/1 |
| 2008/0235501 A1 * | 9/2008 | Bailey ................. G06F 11/1417 |
| | | 713/1 |
| 2008/0307215 A1 * | 12/2008 | Willems .................... G06F 8/60 |
| | | 713/2 |
| 2012/0036041 A1 | 2/2012 | Hesselink |
| 2013/0212401 A1 | 8/2013 | Lin |
| 2013/0232325 A1 * | 9/2013 | Jang ................... G06F 11/1417 |
| | | 713/2 |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0169921 A1 | 6/2014 | Carey |
| 2014/0173187 A1 * | 6/2014 | Ali ......................... G06F 3/0619 |
| | | 711/103 |
| 2014/0173215 A1 | 6/2014 | Lin et al. |
| 2014/0244989 A1 * | 8/2014 | Hiltgen ................. G06F 9/4416 |
| | | 713/2 |
| 2015/0363187 A1 * | 12/2015 | Dhar ........................ G06F 8/665 |
| | | 713/2 |
| 2016/0026532 A1 * | 1/2016 | Friedman ............ G06F 11/1417 |
| | | 714/6.23 |

* cited by examiner

MEMORY PROGRAMMING PROVIDING CORRUPTION PROTECTION

BACKGROUND

Computing systems may have operational firmware programmed in non-volatile memory of the system that directs operation of the system. Such memory can be programmed in various ways.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
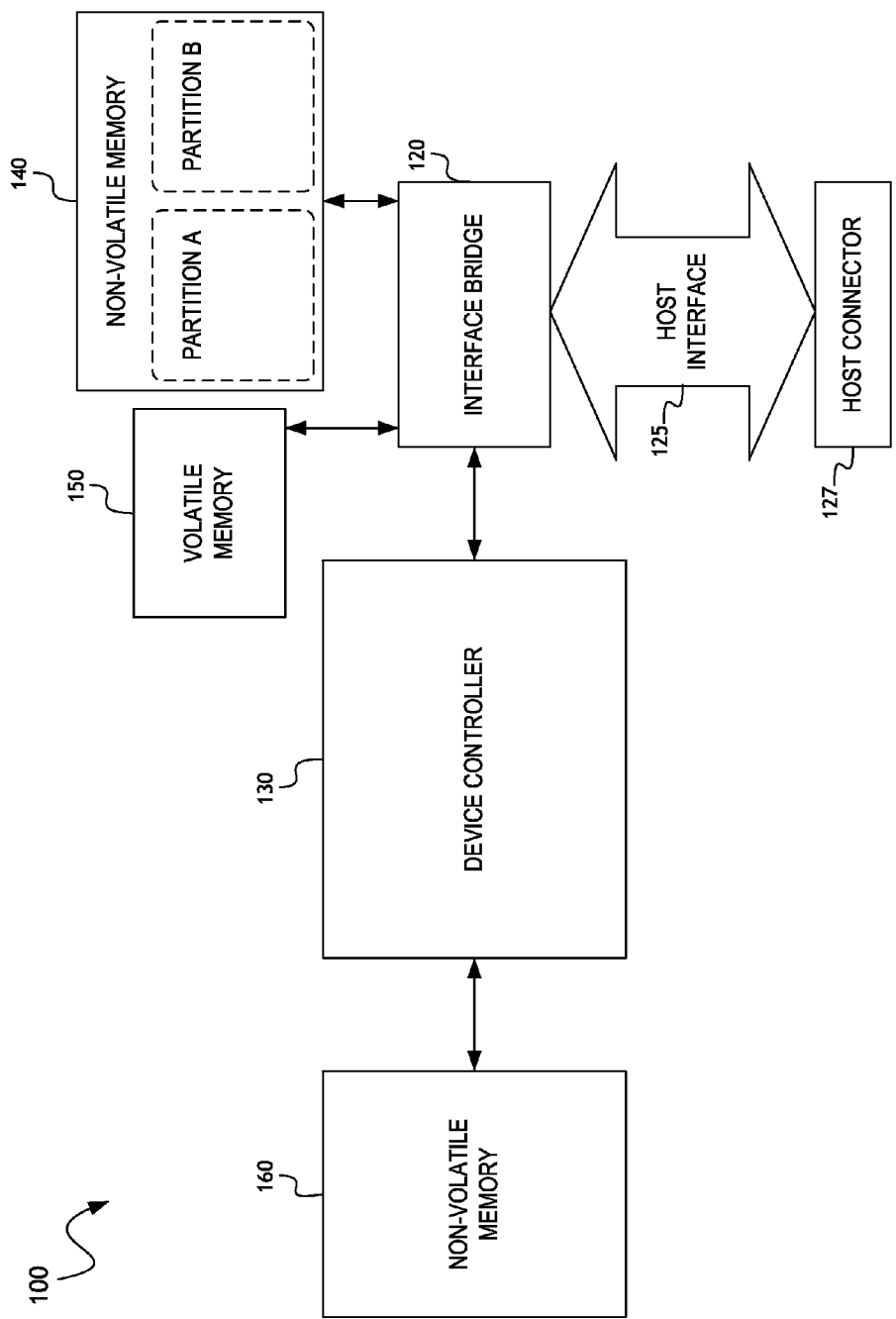
FIG. 1 is a block diagram of a computing system according to one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to programming memory devices.

Overview

The present disclosure describes systems and methods for programming a memory device in a computing system. In certain computing systems, a non-volatile memory device is programmed with a firmware image for directing operation of at least a portion of the computing system. Such programming may occur, for example, in a production environment. In certain embodiments, the entire firmware image may be programmed in its entirety in a single process. While such programming may provide desirable efficiency, susceptibility to corruption may exist if a power failure occurs during the programming process.

Certain embodiments are disclosed herein in the context of data storage devices including a device controller and an interface bridge for communicating with a host device/system over a host interface. It should be understood that the disclosed features and embodiments may be applicable for systems having any type of host interface, such as PCIe, Ethernet, Thunderbolt, SATA, WiFi, or the like. The interface bridge may have associated therewith a non-volatile memory device configured to be programmed with the firmware image for the system. The non-volatile memory device may be, for example, a flash memory.

In certain embodiments, the non-volatile memory device being programmed is a dual-image flash memory, which may advantageously be programmed in such a way as to be relatively robust with respect to power failures. The programming process may be part of a larger factory process. Processes that take power failure risk into account may be desirable, for example, to account for the relative frequency of power interruptions in certain factory processes. Implementation of processes disclosed herein may provide improved robustness for factory processes with respect to corruption of the programmed memory device (e.g., flash). Processes disclosed herein may allow for device recovery after power failure by one of a plurality of possible means, depending on what point in the process the power failure occurred. In certain embodiments, once the end user firmware has been successfully programmed, processes disclosed herein may involve using metadata to designate the firmware image as active; such metadata may be inspected after a power cycle to determine whether re-programming of the firmware image is required.

Computing System

FIG. 1 is a block diagram of a computing system 100 according to one or more embodiments. The system 100 includes a device controller 130 as well as an interface bridge 120 configured to facilitate communication over a host interface 125. The system 100 may be, for example, an integrated USB storage drive. The interface bridge 120 may be any type of bridge, such as USB, PCIe, Ethernet, or the like, and may be a wired or wireless communication interface. The interface bridge 120 may further be connected to and/or associated with one or more non-volatile storage modules 140, such as a flash memory device coupled to the interface bridge 120 over, for example, a serial peripheral interface (SPI) connection, as well as one or more volatile memory modules 150.

The media of the non-volatile storage 140 may be separated into a plurality of partitions (e.g., partition A, partition B). The term "partition" is used herein according to its broad and ordinary meaning, and may include any type of partition, segment, group, collection or section of memory sectors, addresses, cells, media, or other portion of memory. With multiple partitions, the non-volatile memory may ultimately hold multiple copies of firmware for the system 100. In certain embodiments, the partitions of the non-volatile memory 140 each comprise 64 kB of data storage. While only two partitions are illustrated (partition A, partition B), it should be understood that the non-volatile memory 140 may comprise any suitable or desirable number of partitions.

The non-volatile memory 140 may be programmed with a bootloader program designed to direct the device controller 130 and/or other component of the system 100 to load an end user firmware image to the non-volatile memory 140. Various processes may be implemented for loading the final firmware image onto the non-volatile memory 140 (e.g., flash). If power failure occurs at some point during the process of programming the non-volatile memory 140, the copy of firmware programmed may be invalid if adequate power-failure protection mechanisms are not employed as described herein.

The system may be configured to implement a sequence of tasks to ensure that the non-volatile memory 140 is tolerant to power failure with regard to retention of firmware programmed therein. For example, bootloader code executed from the non-volatile memory 140 or other component of the system 100 may direct at least certain power failure tolerant features disclosed herein. According to certain embodiments, if power loss occurs after the final firmware image has been loaded to the non-volatile memory 140 and after the device controller 130 and/or other component(s) of the system 100 has designated the firmware image as an active image in the non-volatile memory 140, rather than re-programming the non-volatile memory 140 with the firmware image, the system 100 may be configured to recognize the active copy of the firmware and merely copy the firmware to another partition of the non-volatile memory to create a redundant copy for the firmware.

The system 100 may include an additional non-volatile memory module or device 160, such as a hard disk memory or other non-volatile memory. In certain embodiments, the firmware image programmed to the non-volatile memory 140 may be provided from the non-volatile memory 160. In certain embodiments, one or more of the illustrated components of the system 100 may be mounted to a printed circuit board (PCB), which may constitute a computing device (e.g., data storage drive).

Memory Programming Process

Figures 2, 3:
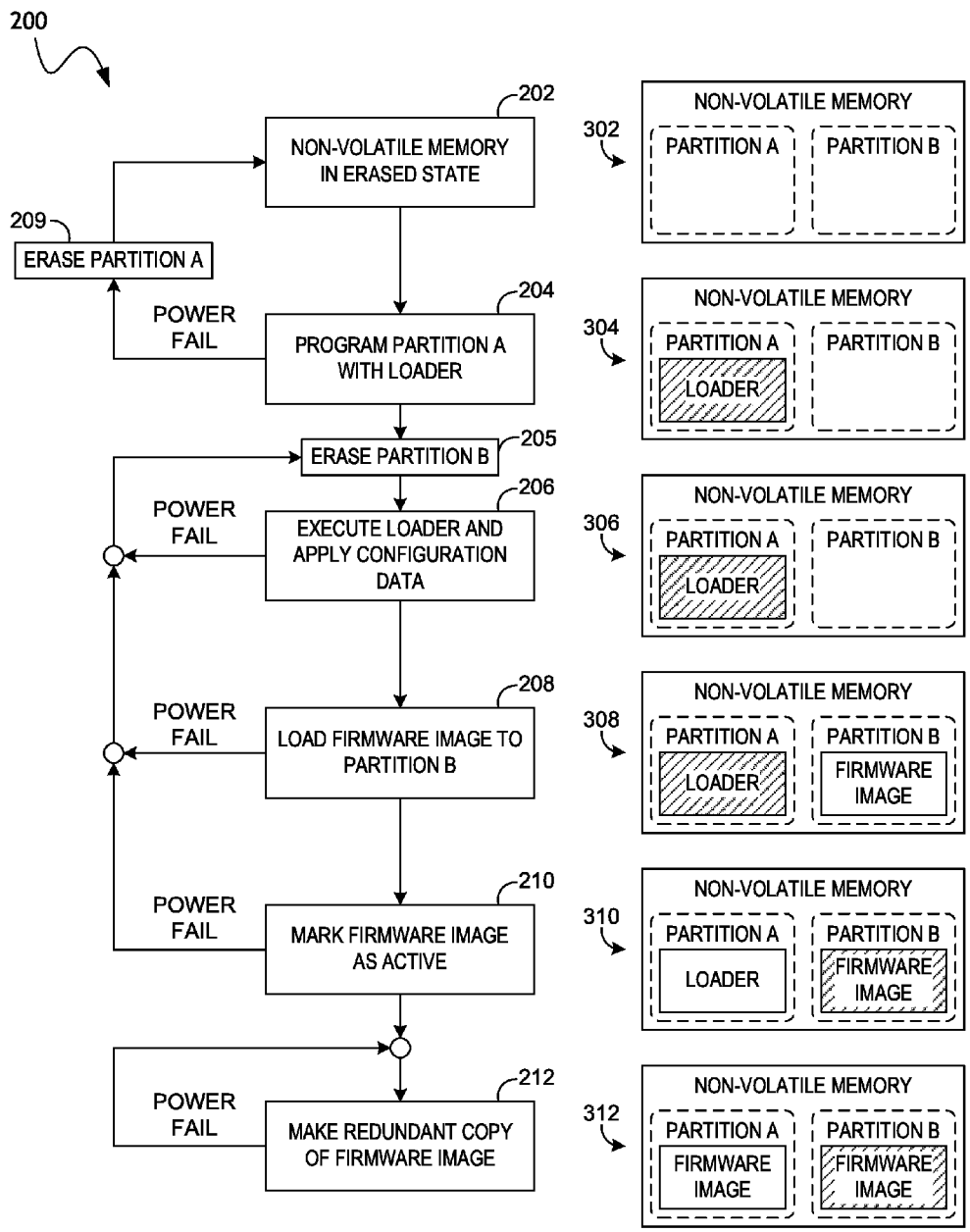
FIG. 2 is a flow diagram of a process for programming a memory device according to one or more embodiments.
FIG. 3 is a block diagram showing states of a memory device according to one or more embodiments.

As described above, the programming of a final firmware image to non-volatile memory in a computing system may be necessary to allow the computing system to properly boot following a power cycle. If programming of the non-volatile memory is directed by a bootloader program, it may be beneficial to avoid overwriting such program with a firmware image to prevent a situation where the bootloader program has been overwritten, and power failure occurs before programming of the firmware image is complete. FIGS. 2 and 3 illustrate certain mechanisms and features for dealing with a power loss while firmware programming is being performed.

FIG. 2 is a flow diagram of a process 200 for programming a memory device according to one or more embodiments. This process 200 may be implemented, for example, as part of a production process. FIG. 3 is a block diagram showing states of a memory device according to one or more embodiments.

At block 202, the process 200 involves providing a non-volatile storage device or module having data storage media comprising at least two partitions, as described above with reference to FIG. 1. The non-volatile storage module 302 illustrates two partitions, partition A and partition B. However, it should be understood that principles disclosed herein may include data storage having any suitable or desirable number of partitions. Furthermore, although the illustrated partitions may be described herein as "first" and "second" partitions, and/or "partition A" and "partition B," respectively, it should be understood that references herein to a particular partition may be representative of any partition of a non-volatile memory device, irrespective of physical and/or logical order, or other characteristics. In certain embodiments, the division of the non-volatile storage 302 into two or more partitions may allow for storage of multiple copies of viable code, which may serve to protect against potentially fatal corruption caused by untimely power failure.

At block 204, the process 200 involves programming a first partition, partition A, with bootloader code ("LOADER"). In certain embodiments, the bootloader code is programmed to the non-volatile storage as part of a board testing process. For example, as a final stage or step of the board testing process, the bootloader program may be written to non-volatile memory and designated as active so that the system may know to execute the bootloader in connection with system start-up. The bootloader may be set to an active state by updating metadata to indicate the same.

The non-volatile storage module 304 shows a first partition, partition A, of the non-volatile storage 304 having stored therein the bootloader, wherein the bootloader code is depicted with diagonal lines indicating that it is designated as active within the non-volatile storage 304. At the stage 304, a second partition, partition B, may be effectively erased, or may contain invalid data. According to the process 200, if power failure occurs while the bootloader is being programmed at block 204 prior to completion, the process 200 may proceed to block 209, where partition A is erased for reprogramming of the bootloader at block 204.

At block 205, the process 200 involves erasing the second partition of the non-volatile storage, partition B. Erasing partition B may allow for subsequent programming thereof, as implemented in one or more subsequent steps. At block 206, the process 200 involves executing the bootloader and applying configuration data. The configuration data for the non-volatile storage may include one or more of reporting strings, mode page settings, vendor identifier (VID), product identifier (PID), or other information. The configuration data may provide original equipment manufacturer (OEM) settings. In certain embodiments, metadata indicates whether code programmed in either of the partitions of the non-volatile storage is active. The process 200 may involve calculating a cyclic redundancy check (CRC) value, or other error detection value and writing the value to the non-volatile memory in order to determine whether the configuration data and/or firmware image are valid.

The non-volatile storage module 306 shows partition A still storing the active bootloader code, while partition B is in a substantially erased state. If power failure occurs during initial execution of the bootloader code or application of configuration data at block 206, the process may loop back to block 205, wherein partition B may be erased and execution of the bootloader code may be initiated again at block 206. When re-starting after a power cycle, the relevant metadata may indicate what stage the process 200 was in when the power failure occurred. For example, the metadata may show that there is an active bootloader stored in partition A, and therefore, the process should re-start at block 205, or block 206.

At block 208, the process 200 involves loading a firmware image onto the second partition (partition B) of the non-volatile storage module. The bootloader may cause the firmware image to be programmed in partition B. The firmware image may be loaded from any suitable or desirable interface, such as through the primary host interface. In certain embodiments, the firmware image is loaded from a separate non-volatile memory of the device or system.

The non-volatile storage module 308 shows the firmware image stored in partition B, while the bootloader code remains stored in partition A and active. As shown, in certain embodiments, the bootloader code is not overwritten when the firmware image is written to the non-volatile memory. Although the firmware image has been written to partition B, it is not yet active at this stage; the associated metadata continues to identify the bootloader in partition A as the active program. If power failure occurs while loading the firmware image onto the non-volatile memory, the process 200 may loop back to block 205, where partition B may be erased for re-loading of the firmware image to partition B.

At block 210, the process 200 involves marking the firmware image as active, and possibly thereby deactivating the bootloader code stored in partition A. Marking the firmware image as active may be performed as a separate step to loading the firmware image. In certain embodiments, if power were to fail after the firmware image has been marked as active, the device may be operable without a redundant copy of the firmware.

The non-volatile storage module 310 shows the firmware image stored in partition B and designated as active, while the bootloader code in partition A is no longer active. If power failure occurs prior to the firmware image being marked as active, the process 200 loops back to block 205, where the process of programming partition B with the firmware image can be performed again after a power cycle.

At block 212, the process 200 involves making a redundant copy of the firmware image and storing the copy in partition A. The copy of the firmware image may overwrite the bootloader code previously stored in partition A. After the redundant copy has been successfully programmed, the process 200 may be considered effectively complete. The non-volatile storage module 312 shows the active firmware image stored in partition B, as well as the copy of the firmware image (not active) stored in partition A.

If power failure occurs after block 210, such as at block 212, the process 200 may not require erasure of, and/or re-loading of the firmware image to, partition B, as it will already be present and active. That is, at such point the device may be considered substantially configured and operational. During the next power-on sequence, the redundant firmware image may instead be created. After a power cycle, if the relevant metadata indicates that partition B is active and partition A is either substantially erased or has end user firmware stored therein, the process 200 may involve copying the active firmware image over to the other partition.

In certain embodiments, more than two copies of end user firmware are maintained in the non-volatile memory 312. For example, additional copies may be used for voting purposes, or as additional firmware states that may be usable with the device. In an embodiment, a copy of firmware is maintained that corresponds to an original factory-shipped device state, which may be recreated at some point when the device is in the field.

The various embodiments disclosed herein may allow the programming of non-volatile memory (e.g., USP SPI flash) to be tolerant of power failures. Once the device has been programmed with a bootloader, it may be recoverable by reprogramming the device and letting the firmware update a redundant copy.

Additional Embodiments

Those skilled in the art will appreciate that in some embodiments, other types of non-volatile memory programming systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed:

1. A method of programming firmware in a computing system, the method comprising:
    loading boot loader code to a first partition of a non-volatile storage, the boot loader code comprising instructions for loading a firmware image that is separate from the boot loader code to the non-volatile storage;
    marking the boot loader code as active;
    in response to a system start-up, executing the boot loader code using one or more processors of the computing system; and
    as directed by the boot loader code:
        loading the firmware image from a location separate from the non-volatile storage to a second partition of the non-volatile storage, the second partition being separate from the first partition;
        marking the firmware image as active;
        following a power cycle, determining that the firmware image is stored in the second partition and has been marked as active; and
        in response to said determination, making a copy of the firmware image and storing the copy of the firmware image in the first partition, thereby overwriting the boot loader code in the first partition with the copy of the firmware image;
    wherein the method is performed at least in part by the one or more processors of the computing system.

2. The method of claim 1, further comprising:
    following a separate power cycle, determining that an active copy of the firmware image is not stored in the non-volatile storage; and
    in response to said determination that an active copy of the firmware image is not stored in the non-volatile storage, executing the boot loader code from the first partition.

3. The method of claim 1, wherein the non-volatile storage and the one or more processors are components of a data storage drive.

4. The method of claim 1, wherein the non-volatile storage is a flash memory communicatively coupled to an interface bridge module of the computing system.

5. The method of claim 4, wherein said loading the firmware image to the second partition is performed at least in part using a host interface communicatively coupled to the interface bridge module.

6. The method of claim 1, wherein said marking the firmware image as active comprises setting metadata associated with the firmware image to a first value.

7. The method of claim 1, further comprising:
making an additional copy of the firmware image; and
storing the additional copy in the non-volatile storage.

8. The method of claim 1, wherein:
the firmware image is loaded from a second non-volatile storage of a data storage drive; and
the non-volatile storage is a component of the data storage drive.

9. A computing system comprising:
a device controller comprising one or more processors; and
a non-volatile storage having boot loader code stored in a first partition thereof, the boot loader code being marked as active and comprising instructions for loading a firmware image that is separate from the boot loader code to the non-volatile storage;
wherein the device controller is configured to:
   in response to a system start-up, execute the boot loader code using the one or more processors;
   load the firmware image from a location separate from the non-volatile storage to a second partition of the non-volatile storage, the second partition being separate from the first partition;
   mark the firmware image as active;
   following a power cycle, determine that the firmware image is stored in the second partition and has been marked as active; and
   in response to said determination, make a copy of the firmware image and store the copy of the firmware image in the first partition, thereby overwriting the boot loader code in the first partition with the copy of the firmware image.

10. The computing system of claim 9, wherein the device controller is further configured to:
   following a separate power cycle, determine that an active copy of the firmware image is not stored in the non-volatile storage; and
   in response to said determination that an active copy of the firmware image is not stored in the non-volatile storage, execute the boot loader code from the first partition.

11. The computing system of claim 9, wherein the computing system is a data storage drive.

12. The computing system of claim 9, wherein the non-volatile storage is a flash memory communicatively coupled to an interface bridge module of the computing system.

13. The computing system of claim 12, wherein the device controller is further configured to receive the firmware image over a host interface communicatively coupled to the interface bridge module.

14. The computing system of claim 9, wherein the device controller is configured to mark the firmware image as active at least in part by setting metadata associated with the firmware image to a first value.

15. The computing system of claim 9, wherein the device controller is further configured to:
   make an additional copy of the firmware image; and
   store the additional copy in the non-volatile storage.

16. The computing system of claim 9, wherein:
the device controller is further configured to load the firmware image from a second non-volatile storage of a data storage drive; and
the non-volatile storage is a component of the data storage drive.

* * * * *